United States Patent [19]

Tanaka et al.

[11] Patent Number: 4,918,360
[45] Date of Patent: Apr. 17, 1990

[54] ELECTRIC-DRIVING DEVICE FOR OPENABLE MEMBERS

[75] Inventors: Takahiko Tanaka, Hamana; Kazukiyo Okada; Akira Tsunoda, both of Kosai; Nobuyuki Yamamoto, Toyohashi; Tatsuo Maeda, Hiroshima; Seiichi Omoto, Hiroshima; Kozo Odoi, Hiroshima, all of Japan

[73] Assignees: ASMO Co., Ltd., Kosai; Mazda Co., Ltd., Hiroshima, both of Japan

[21] Appl. No.: 227,128

[22] Filed: Aug. 2, 1988

[30] Foreign Application Priority Data

Aug. 4, 1987 [JP] Japan .................. 62-195108
Aug. 4, 1987 [JP] Japan .................. 62-195106

[51] Int. Cl.⁴ .............................. H02P 7/68
[52] U.S. Cl. ....................... 318/41; 318/55; 318/266; 318/467
[58] Field of Search .............. 318/41, 55, 264, 265, 318/266, 282, 283, 286, 466, 467

[56] References Cited

U.S. PATENT DOCUMENTS 2,692,162 10/1954 Rossmann .
2,753,508  7/1956 Inman .
3,116,087 12/1963 Baumann et al. .
4,093,851  6/1978 Paulinski .
4,234,833 11/1980 Barrett ................. 318/282
4,408,146 10/1983 Beckerman ............ 318/265 X
4,468,596  8/1984 Kinzl et al. ........... 318/468 X
4,563,625  1/1986 Kornbrekke et al. ...... 318/283 X
4,644,235  2/1987 Ohta .
4,766,356  8/1988 Handa et al. .

FOREIGN PATENT DOCUMENTS 1522822  8/1978 United Kingdom .
2120427A 11/1983 United Kingdom .

Primary Examiner—Bentsu Ro
Attorney, Agent, or Firm—Burns, Doane, Swecker & Mathis

[57] ABSTRACT

An electric driving device for openable members in which an openable member is opened and closed by rotation of driving shafts provided on right and left sides. The device includes a motor which rotates the driving shafts via a reduction mechanism, and switching relays which switch the rotational direction of the motor. Open and close command switches command the opening and closing of the openable member and a rotation synchronization sensor associated with the motor generates pulses synchronized with the rotation of the motor. A mechanical stopper limits the rotation of the driving shaft which is rotated via the reduction mechanism of the motor and a motor lock detecting means detects locking of the motor by detecting the pulse width generated by the rotation synchronization sensor. Also, an actuation stopping arrangement stops the actuation of an actuation device which supplies current to the motor if a signal is generated by the detection apparatus that detects locking of the motor.

4 Claims, 17 Drawing Sheets

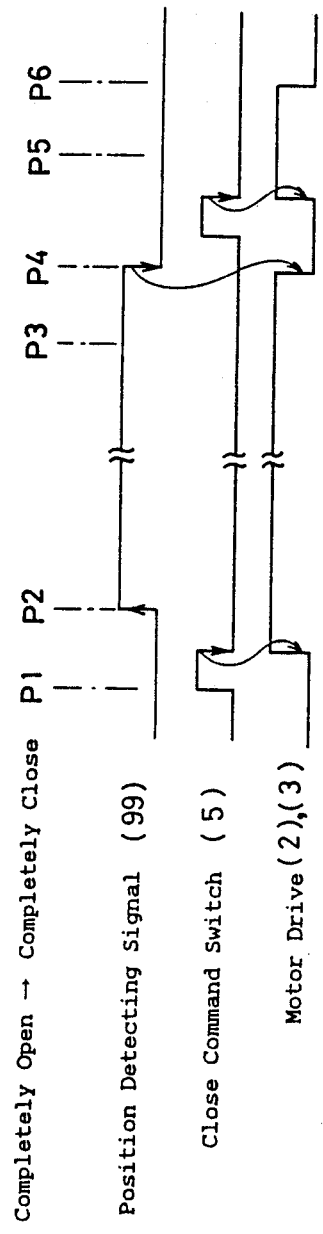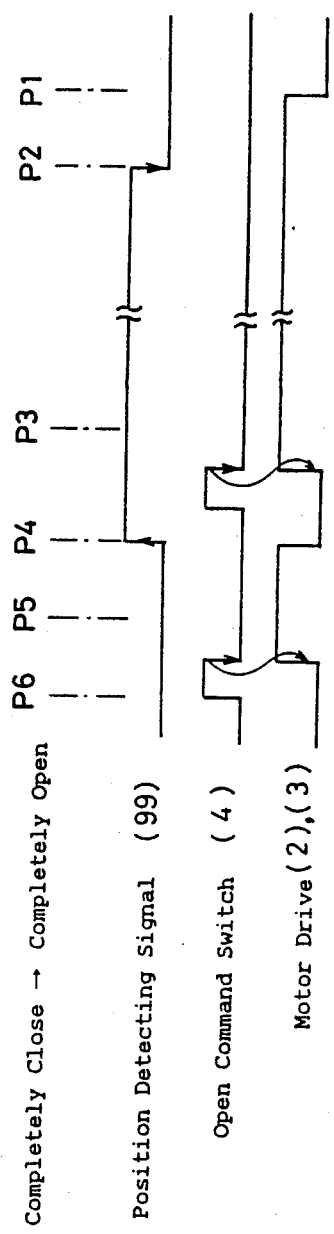

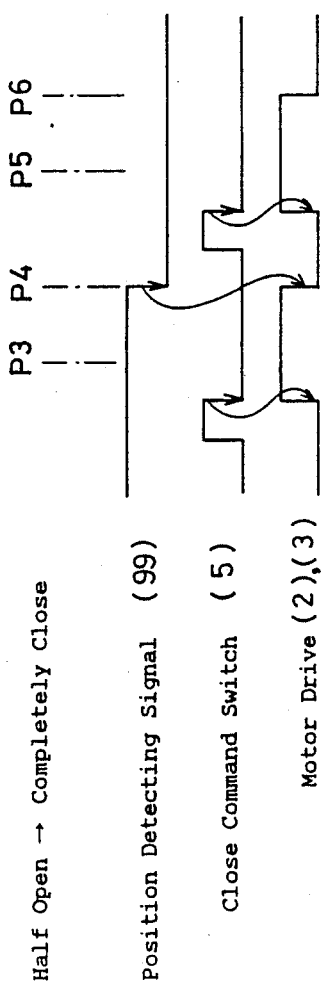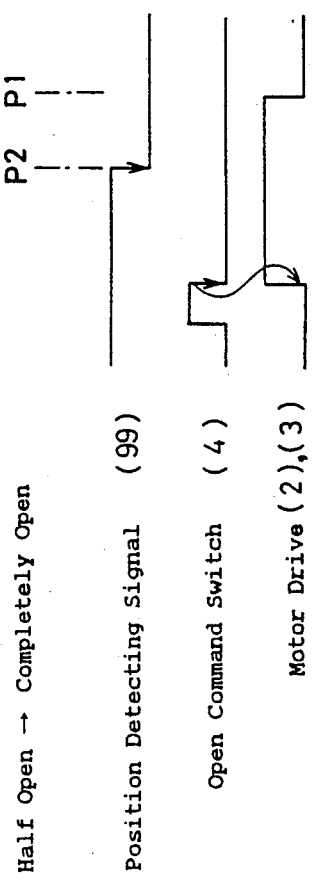

ELECTRIC-DRIVING DEVICE FOR OPENABLE MEMBERS

BACKGROUND OF THE DISCLOSURE

The present invention relates to an electric-driving device for openable members such as a vehicle top, a hothouse window, and other openable members.

DESCRIPTION OF THE PRIOR ART

U.S. Pat. No. 3,116,087 discloses a drive arrangement for foldable tops of motor vehicles wherein a source circuit is opened and a motor is stopped as an abutment member of the switch finger rotated via a reduction gear by means of the motor which abuts on a position-limiting switch. Consequently, because openable members interlocking with the motor rotate beyond a defined position when the position limiting switch breaks down, there is a problem in that an arrangement breaks down. Furthermore, such an arrangement is dangerous a human body or anything is sandwiched between a top and a vehicle body because the motor is rotated till said open and close switch is returned to the neutral position or the abutment member abuts on the position-limiting switch once the open and close command switch is closed.

SUMMARY OF THE INVENTION

It is a general object of the present invention to provide an electric-driving device for openable members which is very safe.

It is a more specific object of the present invention to provide an electric-driving device for operable members which prevents a driving shaft rotated via a reduction mechanism by means of a motor from rotating beyond a defined position and therewith stops electricity to the motor automatically when the driving shaft rotates in a defined position.

It is another object of the present invention to provide an electric-driving device for openable members wherein an openable member can be automatically stopped just before the openable member is completely closed or opened so that safety can be assured.

It is still another object of the present invention to provide an electric-driving device for openable members wherein an openable member is not momentarily stopped and the opening and closing movement is continued without interruption soon after a close command switch or open command switch is operated when the openable member is near the momentary stopping position.

It is a further object of the present invention to provide an electric-driving device for openable members comprising:

a motor rotating a driving shaft provided in right and left sides via a reduction mechanism, an open command switch and a close command switch which command opening and closing of an openable member, an open and close command detecting means which determines whether or not said open command switch and said close command switch are operated, an actuation means opening and closing an openable member if the open command switch or the close command is operated, a rotation synchronization sensor provided in at least one motor of said both motors and generating a pulse synchronized with a rotation of a motor, a mechanical stopper limiting rotation of a driving shaft rotated via a reduction mechanism by means of a motor, a motor lock detecting means detecting said both motor lock by detecting the width of the pulse generated from the rotation synchronization sensor, an actuation stopping means which stops actuation of the actuation means if there is a signal from the motor lock detecting means.

According to the above-stated construction, if the driving shaft rotates beyond a defined position for certain reasons, for instance, owing to trouble concerning a limit switch, because a opening and closing member such as a crank arm coupled with the driving shaft, abuts on a mechanical stopper, a rotation of the driving shaft is compulsorily limited and a rotary number of the motor is decreased by the lock of the motor a width of a pulse generated by rotation synchronization sensors widens, an actuation stopping means interrupts an electrical power feeding to the motor automatically and an opening of the top is stopped as a signal is given by a motor lock detecting means.

It is a still further object of the present invention to provide an electric-driving device for openable members which opens and closes the openable member on the driving shafts arranged in the right and left sides, said device comprising:

a motor rotating on at least one of said driving shafts via a reduction mechanism, a switching means which switches a connection with the electric source so that the motor can be rotated clockwise or counterclockwise and stopped, an open command switch and a close command switch which commands opening and closing of said openable member, an actuation means switching the switching means to open and close the openable member if either of said open command switch and said close command switch is operated, a position sensor which is provided for the driving shafts for detecting whether or not the driving shafts are rotated in the defined position just before the openable member is closed, a momentary stopping means which stops the motor by switching said switching means according to the position signals generated by the position sensors.

According to the above-mentioned construction, the motor commences rotation and an opening and closing movement of the openable member is started by operation of a close command switch or an open command switch. When the openable member reaches a defined position just before a completely-closed position or a completely-opened position, it is detected by a position signal generated from a position sensor and a momentary stopping means automatically interrupts a supply of the current to the motor and the opening and closing movement of the openable member is stopped. An operator can recommence opening and closing of the openable member, and open and close the openable member completely by means of operating the close command switch or the open command switch again after ascertaining that it is safe to complete the opening or closing.

It is another object of the present invention to provide an electric-driving device for openable members comprising:

a rotation sensor which is provided in said motor and which generates a pulse synchronized with a rotation of the motor, a motor rotation calculating means which calculates the pulse generating number after a rotation of the motor is started by means of said actuation means, a momentary stoppage prohibiting means which prohibits an actuation of said momentary stopping means if the number of the generated pulse calculated by the calculating means does not reach the defined number.

According to the above-mentioned construction, if the opening and closing of the top is started in the openable-member stopped condition near a defined position detected by said position sensor, a pulse generating number from a rotation sensor has not reached a defined number yet when the openable member reaches said defined position, a momentary stopping actuation is prohibited by a momentary stoppage prohibiting means causing a detection of the position signal, and the openable member is completely opened and closed without interruption. Thereby, such a device is advantageous insofar as the opening and closing movement of the openable member is not interrupted soon after the close or the open command switch is operated, so an operator does not feel unpleasant.

Because such an action is taken only if the openable member is near said defined position just before the completely-open position or the completely-closed position, an operator can ascertain a safety easily without the momentary stopping actuation during operation of the close or the open command switch.

Other and further objects, features and advantages of the invention will become appear more fully from the following description.

DESCRIPTION OF THE DRAWINGS

FIGS. 6 to 17 show the second embodiment of the present invention, electric-driving device for openable members.

FIG. 6 is a block diagram illustrating a main part.

FIGS. 7(a) and 7(b) are a flow chart illustrating a process of a microcomputer.

FIGS. 8 to 13 are time charts.

FIGS. 14 and 15 are perspective views illustrating a vehicle where a device of the second embodiment is applied.

FIGS. 16 and 17 are front views of said vehicle.

DETAILED DESCRIPTION OF THE PREFERRED EMBODIMENTS

(The First Embodiment)

Following is a description of the first embodiment of the present invention in accordance with the drawings.

Figure 1A:
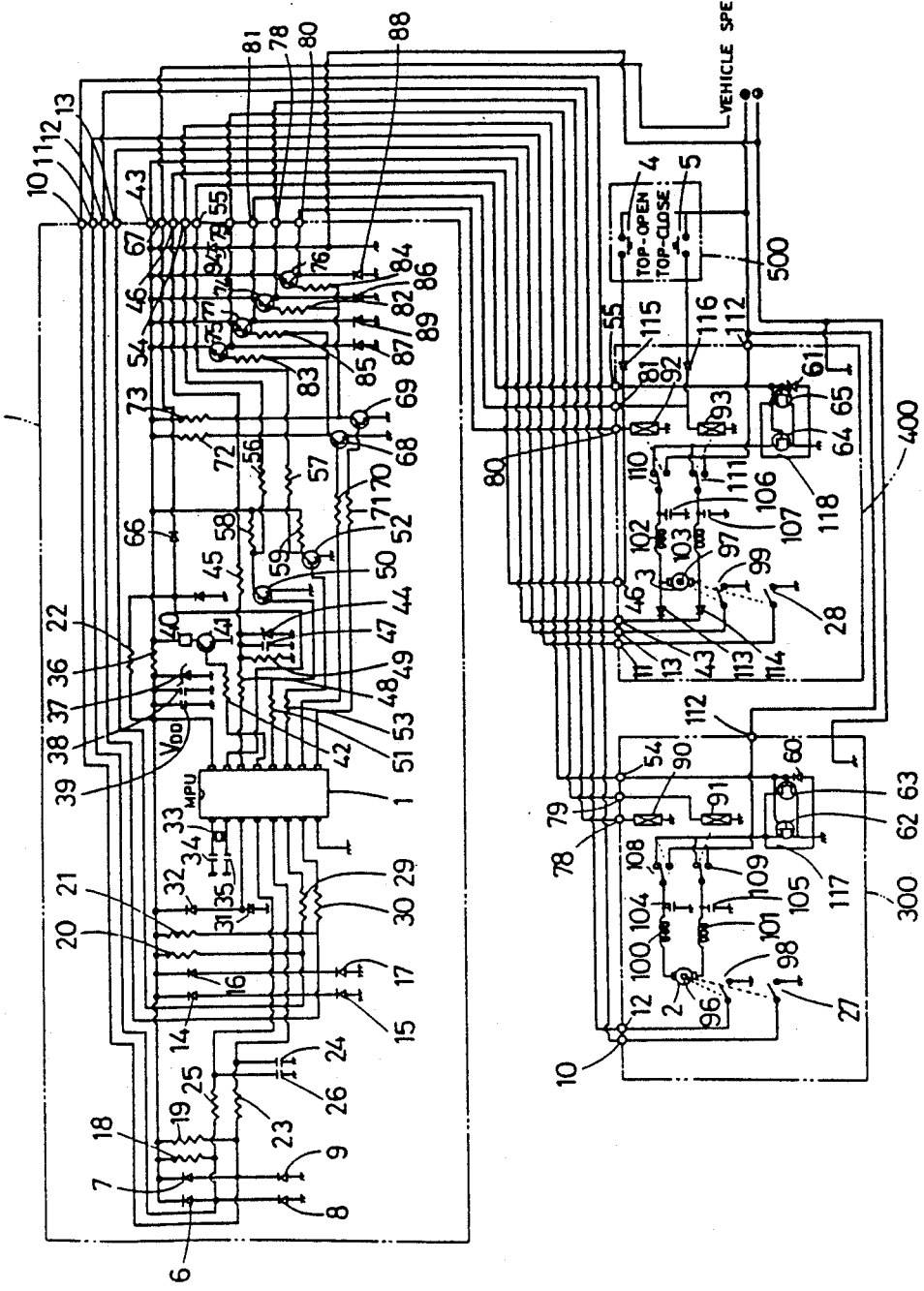
FIGS. 1(a), 1(b) and 1(c) are a circuit diagram illustrating the embodiments of the present invention, electric-driving device for openable members.
Figure 1B:
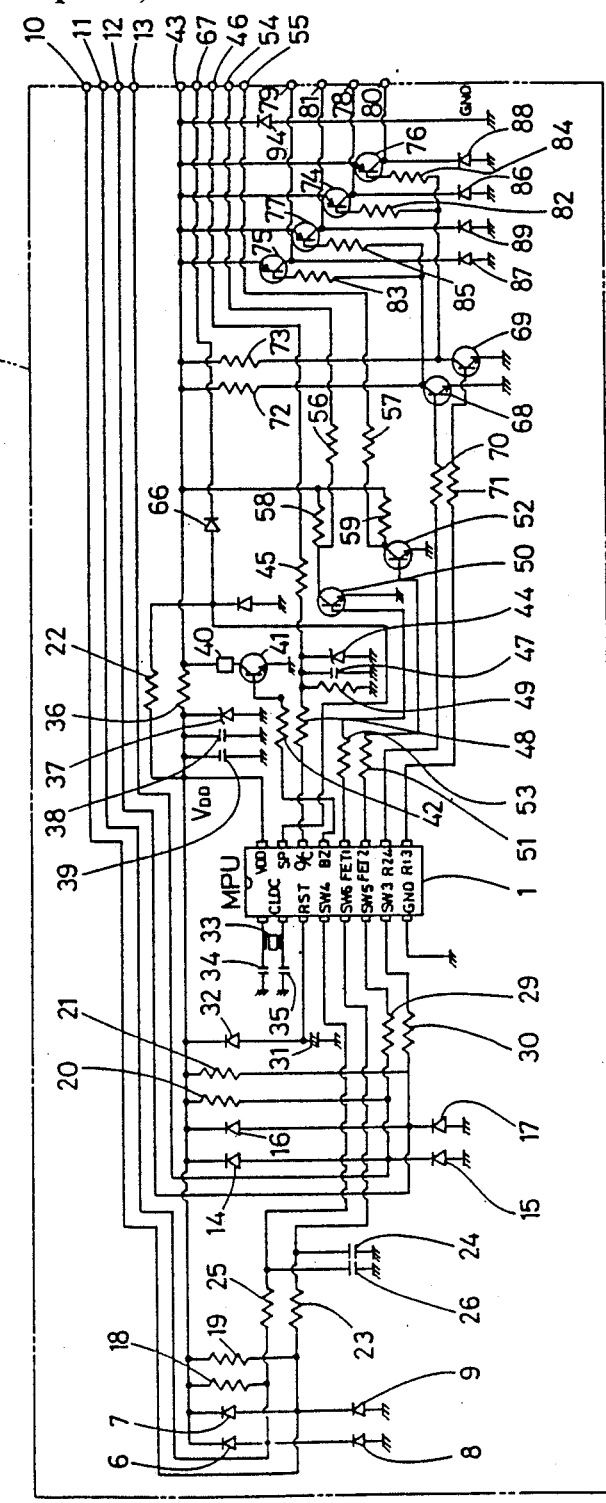
Figure 1:
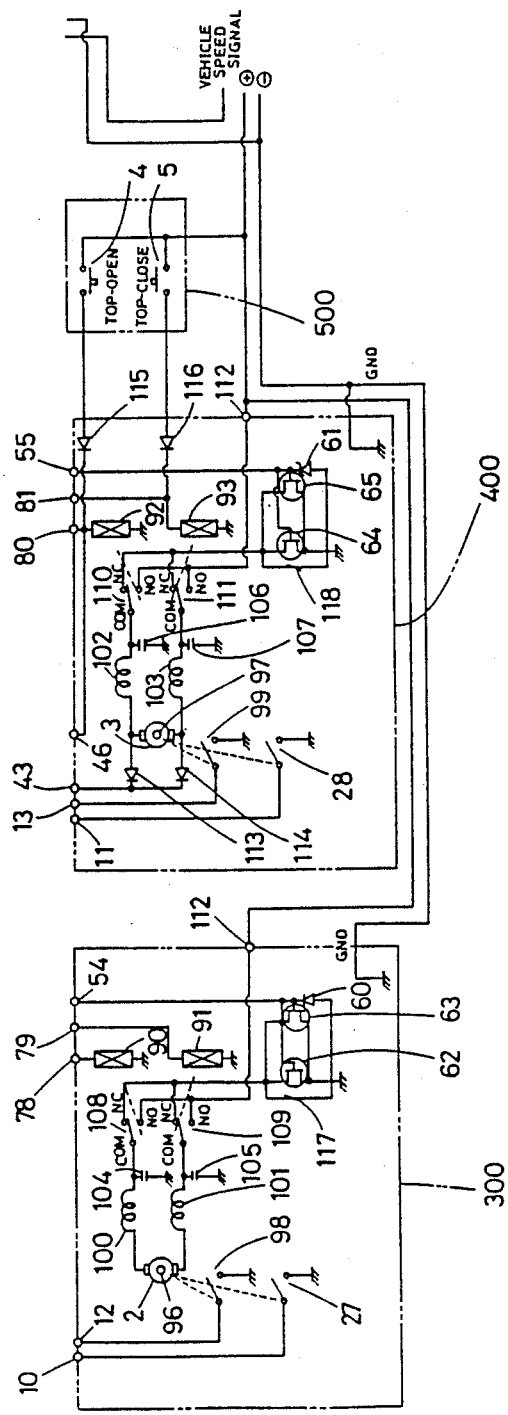

As illustrated in FIGS. 1(a), 1(b) and 1(c), a device for opening and closing of a vehicle top of the present embodiment comprises an actuation circuit 200 with a principal element being microcomputer 1, a primary motor driving circuit 300 with a primary motor 2, a secondary motor driving circuit 400 with secondary motor 3, and an open and close command switch 500 with an open command switch 4 and a close command switch 5 for commanding opening and closing of a top 120. Said switches 4 and 5 are push button switches, which are closed only during operation.

In the actuation circuit 200, diodes 6, 7, 8 and 9 are input protection diodes of the control microcomputer 1 (hereinafter referred to as MPU1). During positive direction surge impression to input terminals 10 and 11 of the actuation circuit 200, MPU1 input ports SW4 and SW6 are shorted by means of the diodes 6 and 7, and during negative direction surge impression, MPU1 is protected by means of the shorting of diodes 8 and 9. Other input protection diodes are diodes 14, 15, 16 and 17. Negative direction surges toward input terminals 12 and 13 of the actuation circuit 200 are shorted by means of the diodes 15 and 17, while positive direction surges from the terminals 12 and 13 are shorted by the diodes 14 and 16, thus protecting input ports SW3 and SW5 of MPU1. Resistors 18, 19, 20, 21 and 22 are pull-up resistors. Resistor 23 and condenser 24, resistor 25 and condenser 26 are integrating circuits eliminating a noise produced via chattering from rotation synchronization sensors 27 and 28. Resistors 29 and 30 are protection resistors for input ports SW5 and SW3 of MPU1. A condenser 31, which is connected to reset port RST of MPU1, is used for a power-on reset. The charging resistance is determined within MPU1. A diode 32 is used for discharging the condenser 31. An oscillator 33 is a ceramic oscillator which generates a clock signal to actuate MPU1. Condensers 34 and 35 stabilize the oscillation of the ceramic oscillator 33. Resistor 36, which is connected to MPU1 power source input port VDD, and a zener diode 37 form a constant-voltage circuit which supplies voltage (5V) to actuate MPU1 from the normal 12V vehicle power source voltage of a power source terminal 43. A condenser 38 is a stabilizing condenser and a condenser 39 is a ceramic condenser which is used for high frequency noise cutting condensers. A ceramic buzzer 40, which is connected to a power source terminal 43, is used to inform an operator of the actuation state of a device for opening and closing of a top. The collector of an actuation transistor 41 is connected in series to the ceramic buzzer 40, and the base of said transistor is connected to the buzzer output port BZ of MPU1 by means of a resistor 42, which is used as a base current limiter. A zener diode 44, which is connected to an input terminal 46 of the actuation circuit 200, and a resistor 45 form a circuit for determining when the open command switch 4 of the open and close command switch circuit 500 is in the closed position. When the open command switch 4 is in the closed position, it forms a constant-voltage circuit stabilizing voltage identical with the MPU1 actuation power source due to the power source positive polarity (+) voltage impression. A condenser 47 is connected in parallel to the zenor diode 44 and they form an integrating circuit for preventing a noise. A resistor 48 is an input protector connected between input port O/C of MPU1 and the non-grounded terminal of the zener diode 44. A pull-down resistor 49 is connected to the port O/C in parallel relationship to the zener diode 44 in order to provide a normal low-voltage (hereinafter referred to as L). A transistor 50, which is connected to MPU1 output port FET1 via a base resistor 51, and a transistor 52, which is connected to output port FET3 via a base resistor 53, are both level conversion transistors which convert the ON/OFF voltage for MPU1 output ports FET1 and FET3 to vehicle power source voltage ON/-OFF. The collector outputs for said transistors 50 and 52 are connected to, respectively, output terminals 54 and 55 of the actuation circuit 200 via resistors 56 and 57. The collectors of the transistors 50 and 52 are connected to, respectively, the power source terminal 43 via collector resistors 58 and 59. Without the aforesaid resistors 56 and 57, zener diodes 60 and 61, which are built into the motor actuation circuits 300 and 400, the device for opening and closing of a top of the present embodiment can work, but since the gate current flow is negligible, there is a tendency for a faulty contact in the vehicle built-in lead wire terminals 54 and 55, whereupon a faulty connector contact is prevented in the terminals 54 and 55 when the transistors 50 and 51 are OFF and a current of several milliamperes (mA) flows to the terminals 54 and 55 via the aforesaid resistors 56, 57 and the zener diodes 60, 61. A vehicle speed signal is introduced into a vehicle speed signal terminal 67 when the vehicle starts running. A diode 66, which is connected between the speed signal terminal 67 of the actuation circuit 200 and MPU1 speed signal input port SP, prevents 12V voltage impression on MPU1 input port SP in order to allow normal vehicle power source (12V) ON/OFF signal to be impressed as a vehicle speed signal. Transistors 68 and 69, which are connected to MPU1 output ports R24 and R13 via base resistors 70 and 71, are level conversion transistors that convert the ON/OFF signals in said resistors R24 and R13 to 12V vehicle power source voltage ON/OFF signals. The collectors of said transistors 68 and 69 are connected to the power source terminal 43 via collector resistors 72 and 73. Relay actuation transistors 74, 75, 76, 77 are transistors which encourage conversion relay coils 90, 91, 92 and 93, respectively. The bases of transistors 74 and 76 are connected to the collector of the level conversion transistor 69 via base resistors 82 and 84. The bases of the transistors 75 and 77 are connected to the collector of the level conversion transistor 68 via base resistors 83 and 85. Diodes 86, 87, 88 and 89, which are inserted between the grounds and the collectors of the relay actuation transistors 74, 75, 76 and 77, absorb a reverse voltage generated from the switching relay coils 90, 91, 92 and 93 of the motor actuation circuits 300 and 40. A diode 94, which is inserted between the ground and the power source terminal 43, absorbs a reverse voltage in the power line in the same way. The motors 2 and 3 of the motor actuation circuits 300 and 400 are direct current ferrite motors, wherein the rotation synchronization sensors 27 and 28 are affixed to the armature, said sensors being photo couplers that turn ON/OFF once with each single revolution of the armature. Motors 2 and 3 have speed reduction mechanism comprised of multiple gear trains, and have position feedback switches 98 and 99 on actuation shafts 96 and 97 of the vehicle top 120, which are the final output shafts. High frequency coils 100, 101, 102 and 103, which are connected in series to the motors 2 and 3, and condensers 104, 105, 106 and 107, which are inserted between the power source of said coils and the grounds, prevent a radio and other equipment from being impaired by a spark noise generated by brushes of the motors 2 and 3. The field effect transistors 62, 63, 64 and 65 are switching motor interrupters for speed regulation of the motors 2 and 3. Source and drain of said field effect transistors 62, 63, 64 and 65 are inserted between the normally closed terminals NC of switching relay contacts 108, 109, 110, 111 and the grounds, and the gates are connected to the terminals 54 and 55, respectively. The common terminal COM of switching relay contacts 108, 109 and switching relay contacts 110, 111 are connected to the motors 2 and 3 by means of high frequency coils 100, 101, 102 and 103, and the normally open terminals NO of said relay contacts 108, 109, 110 and 111 are connected to a power terminal 112. Switching relay contacts 108, 109, 110, 111 and switching relay coils 90, 91, 92, 93 form switching relay for switching the rotary directions of the motors 2, 3, respectively.

In the motor actuation circuit 400, diodes 113, 114 which are connected to the power source terminal 43 and the top and the bottom of the motor 3, prevent short circuiting of the armature of the motor 3, and supply power to the actuation circuit 200 by means of brushes of the motor 3. When the open command switch 4 with a diode 115 connected to the switching relay coil 92, and the close command switch 5 with a diode 116 connected to the switching relay coil 93 are closed, and the field effect transistors 64 and 65 are PFF, voltage generated by the motor 3 is impressed to the power source terminal 43. Thereupon, current is prevented from flowing into the vehicle power source through the transistors 75, 77 or the emitters and collectors of transistors 74, 76, thus preventing the destruction of said transistors 75, 77, 76 and 74. The source and drain of the field effect transistors 62, 63 and 64, 65 are connected in parallel to varistors 117 and 118, respectively, so that reverse voltage generated from the motors 2 and 3 will be absorbed during switching of the field effect transistors 62, 63 and 64, 65.

Figure 2A:
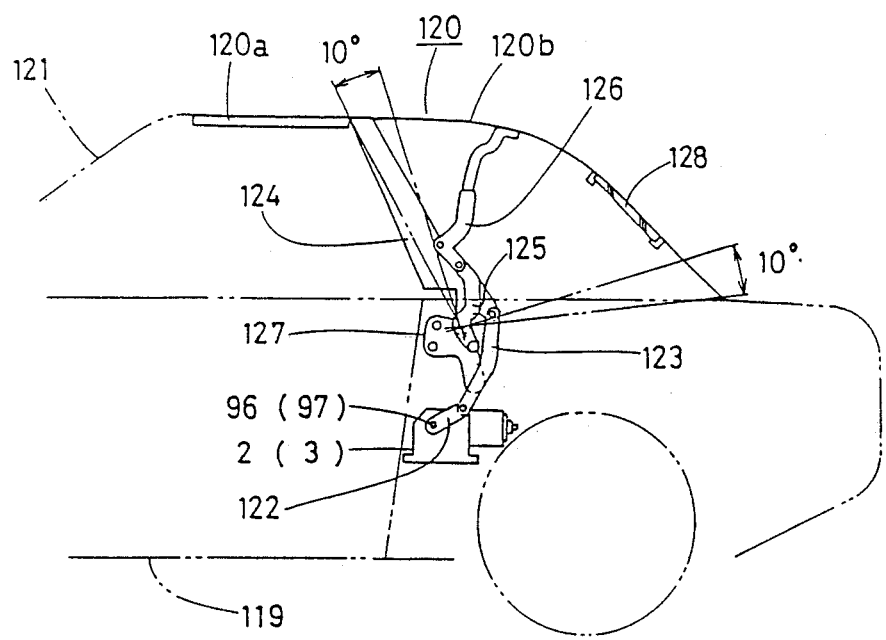
FIG. 2(a) and FIG. 2(b) are perspective front views illustrating a top-closed state and a top-open state.
Figure 2B:
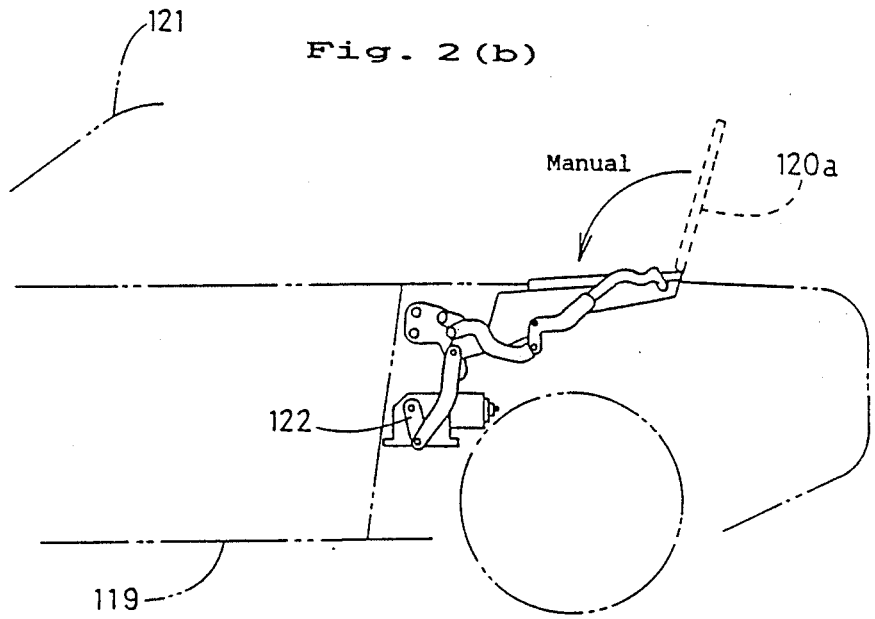

As described in FIGS. 2(a) and (b), on the upper section of a vehicle 119 is provided a top 120 comprised of a vehicle windshield 121, a hard top 120a and a soft top 120b. The top 120 can be opened and closed by means of the driving shafts 96 and 97 attached to both right and left sides of said vehicle 119 through a crank arm 122, a primary link rod 123, a falling pillar 124, a secondary link rod 125 and a forming bar 126. A hinge bracket 127 is fixed to the vehicle 119, and the falling pillar 124 and the secondary link rod 125 are rotatably hinged to the hinge bracket 127. A rear windshield 128 is provided in the soft top 120b. As shown in FIG. 2(b), the hard top 120a is manually rotatable. Two motors 2 and 3, as previously stated, rotate both driving shafts 96 and 97, respectively via the reduction mechanism. The above-stated position detecting switches 98 and 99 are OFF during opening or closing of the top 120, and ON when within 10° of full open or full closed positions.

Figure 3A:
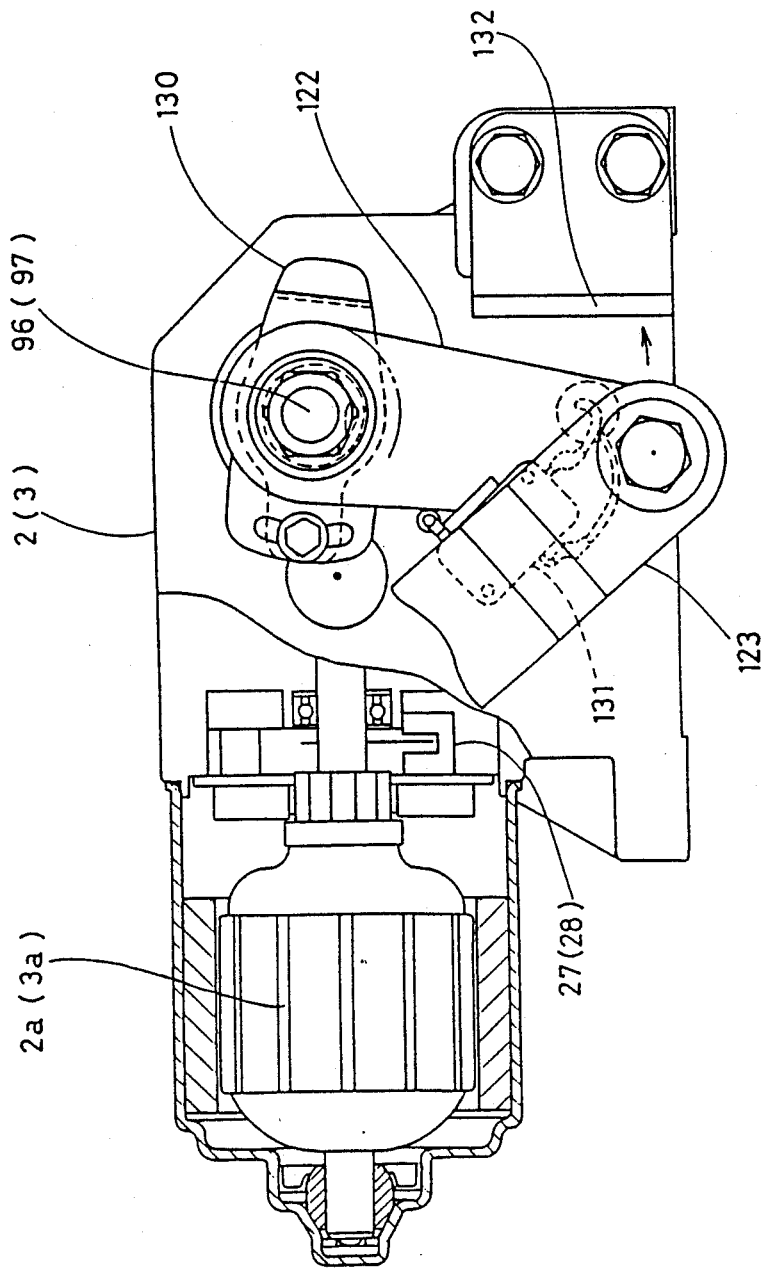
FIG. 3(a) and FIG. 3(b) are a partially fragmentary sectional view and a side view illustrating a construction of motor, respectively.
Figure 3B:
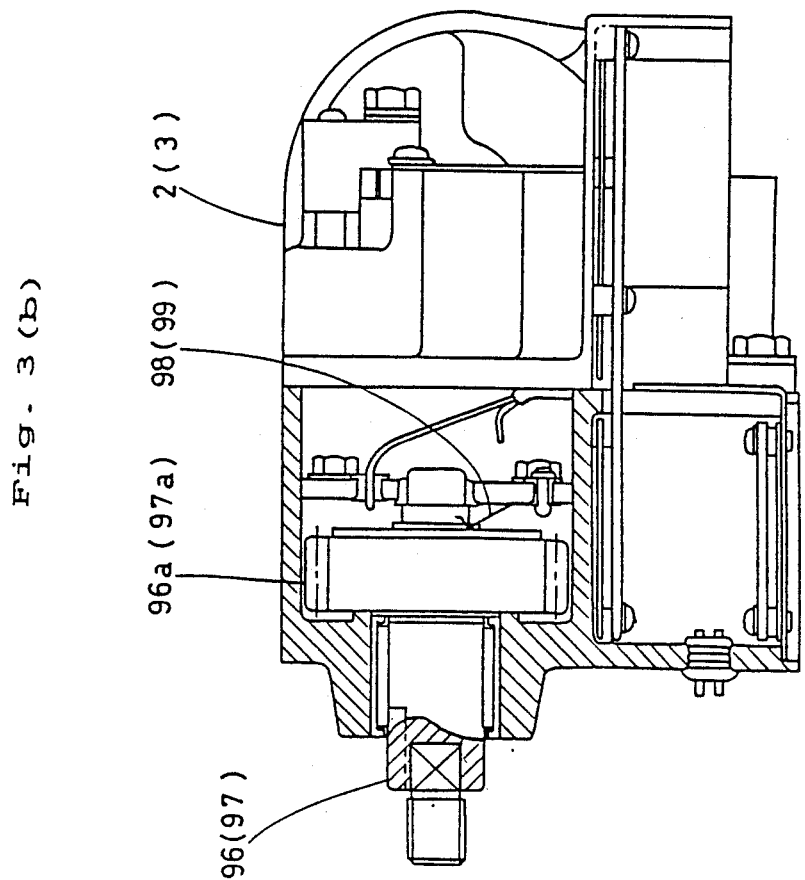

As shown in FIG. 3(a), the motors 2 and 3 have the driving shafts 96 and 97 coupled via armateurs 2a, 3a and the reduction mechanism. The crank arm 122 is coupled with the driving shafts 96, 97, wherein is mounted a limit switch actuation cam 130 which can adjust the actuation position. There is attached to the motors 2 and 3 a limit switch 131 cooperating with the limit switch actuation cam 130, said switch opens the power source of the motors 2, 3 by contact of the limit switch actuation cam 130 with the limit switch 131, when the crank arm 122 reaches an open actuation terminal. However, if the limit switch 131 breaks down, because the crank arm 122 may overrun and break the rear windowpane 128 or the like, L-shaped mechanical stopper 132 is fixedly installed in the motors 2, 3 and rotation of the crank arm 122 is compulsorily limited in the present embodiment. As stated later, in the present embodiment the motors 2 and 3 are OFF during limiting of motor rotation for more than 3 seconds by giving a motor lock detecting function to the actuation circuit 200 with a principal element being the control microcomputer 1. The rotation synchronization sensors 27 and 28 by a photo coupler are attached to rotary shafts of the armateur 2a, 3a. As shown in FIG. 3(b), within the motors 2 and 3, the position detecting switches 98 and 99 are provided at the rear of final output step gears 96a and 97a coupled directly with the driving shafts 96 and 97.

(Actuation of the first embodiment)

Figure 4:
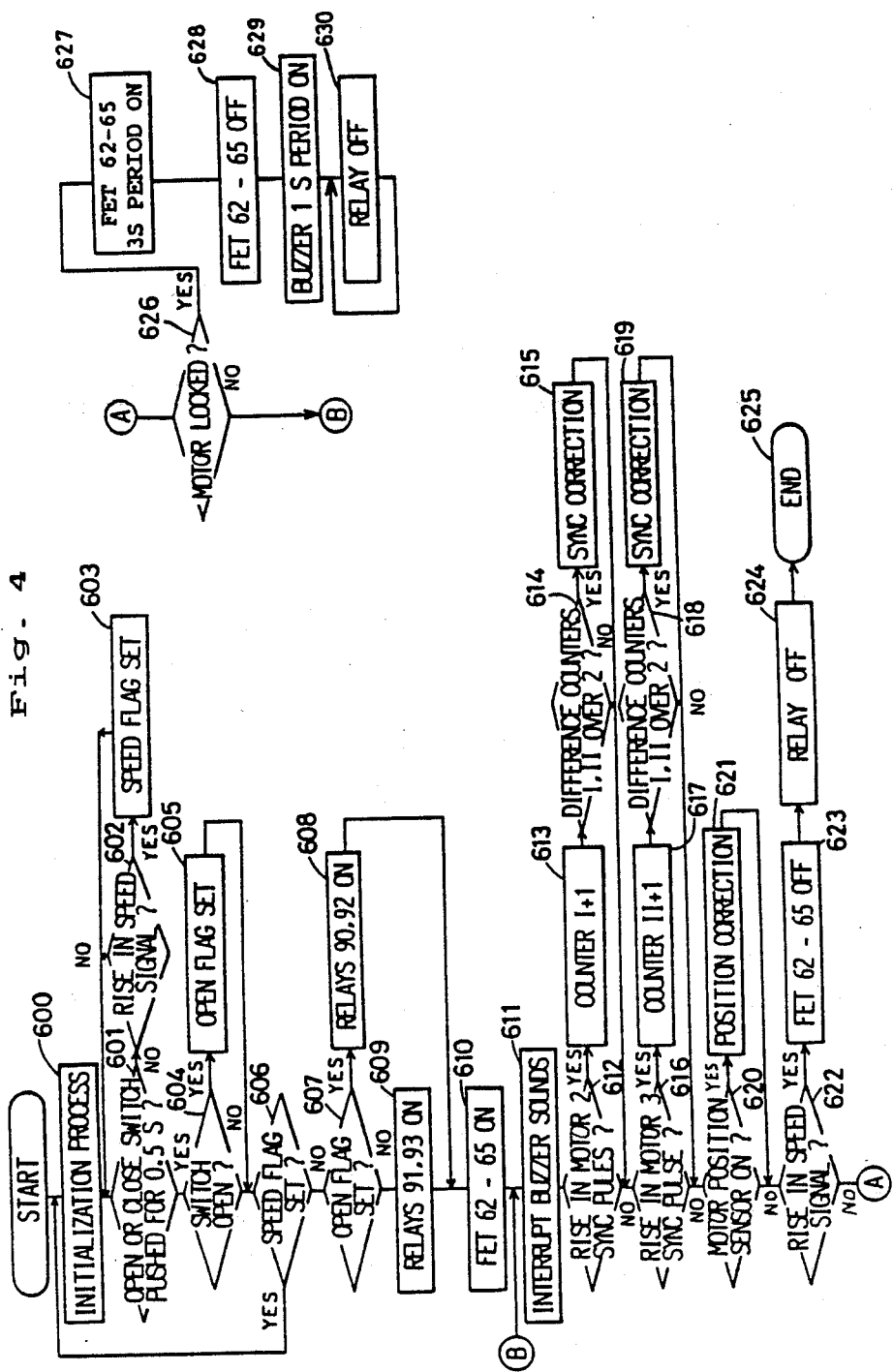
FIG. 4 is a flow chart illustrating a program of a microcomputer.
Figure 5:
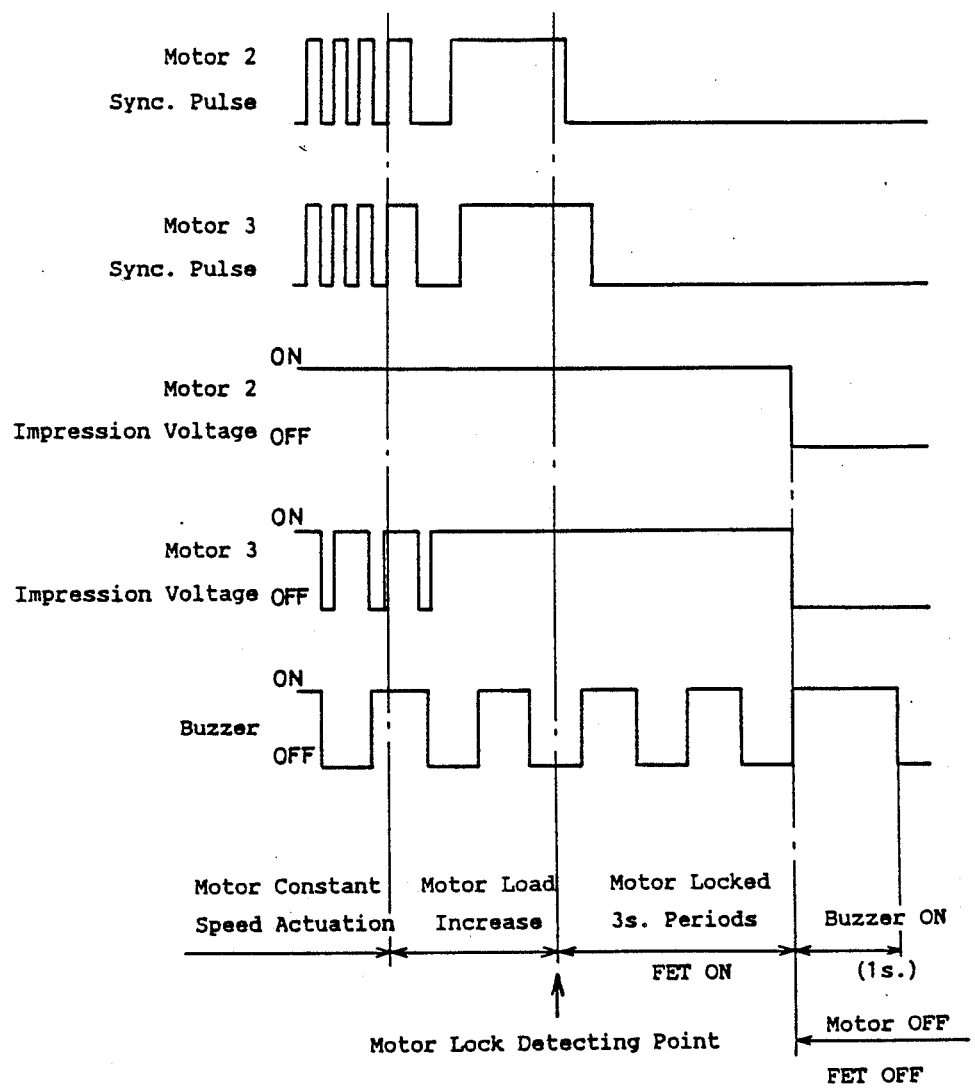
FIG. 5 is a timing chart illustrating an actuation when a motor is locked.

Actuation shall be explained herein in accordance with FIG. 4 showing MPU1 program, a timing chart when a motor is locked, which is shown in FIG. 5 and the aforesaid FIGS. 1(a), 1(b) and 1(c) to FIGS. 3(a) and (b).

FIGS. 1(a), 1(b) and 1(c) describe a circuit in a nonactuating state. At this time, the open command switch 4 and the close command switch 5 are both opened, and voltage from the power terminal 112 is only impressed to normally open contacts NO of switching relay contacts 108, 109, 110 and 111. Thus, there are no malfunctions of the motors 2 or 3 due to a noise or the like because a vehicle power source positive polarity voltage is not supplied to the motors 2, 3 or the power source terminal 43 of the actuation circuit 200. Explanation now follows for the actuation process when the open command switch 4 is pushed to open the top 120 of the vehicle 119 when it is in the completely-closed state. When the open command switch 4 is closed, current flows from the positive power source through said switch 4, diode 115 and relay coil 92 to the ground, the switching relay contact 110 is ON and the common terminal COM makes contacts with normally open contact NO. When the switching relay contact 110 is ON, power originating from the positive power source is supplied from the power terminal 112, the normally open contact NO of the switching relay contact 110, common terminal COM, the high frequency coil 102 and the diode 113 to the power source terminal 43, thus actuating the actuation circuit. When power is supplied to the power source terminal 43, the condenser 31 is charged from the grounded side and MPU1 is reset by the slower voltage impression to the RST port than the VDD port. During this reset, MPU1 output ports R13, R24, FET3, FET1 and BZ are all at low electric potential (hereinafter low voltage is referred to as "L" and high voltage "H"), the transistors 41, 50, 52 and the transistors 68, 69 are all in OFF state, and through the OFF state of the transistor 68 and 69, the transistors 74, 75, 76 and 77 also reach the OFF state. In step 600, each flag and counter of MPU1 undergoes initialization. Whereupon, in the loops of steps 601 and 602, a check is made for a rise from "L" to "H" in the vehicle speed signal. After the open command switch 4 (or the close command switch 5) is pressed for more than 0.5 s, the process continues to step 604. The aforesaid loop prevents unstable running of the vehicle 119 due to malfunction of a device for opening and closing of a top when the switch 4 or 5 is mistakenly touched or when buffeting wind is encountered by opening or closing of the top 120 while the vehicle is running. In step 604, it is decided which switch is pushed, the open command switch 4 or the close command switch 5. In the present embodiment, when the open command switch 4 is closed, voltage from said switch 4 is applied to MPU1 input port O/C by means of the diode 115 and the terminal 46, said port O/C thus registers "H". When the close command switch 5 is closed and the open command switch 4 is opened, said port O/C registers "L" via the pull-down resistor 49. When said input port O/C registers "H", the open flag is set in step 605. In step 606, a check is made to determine whether or not the vehicle speed flag is set. If the results are positives, the process returns to step 606 and the following operations do not occur, that is, while the vehicle 119 is running, the top 120 cannot open or close. If the results of determination in step 606 are negative, a check is made in step 607 to see whether or not the open flag is set. Since positive results are derived in the present embodiment, in step 608, MPU1 output port R13 registers "H", the level conversion transistor 69 registers ON, the switching relay actuation transistors 74 and 76 are ON, and the switching relay coils 90 and 92 register ON, by means of the current from the output terminals 78 and 80. Consequently, the common terminal COM of switching relay contacts 108, 110 is connected to the normally open terminal NO. Thereupon, the relay actuation transistors 74, 76 of the actuation circuit 200 maintain the ON state due to the voltage supplied from the vehicle power source positive polarity to the power source terminal 43 from the normally open terminal NO of the switching relay contact 110 through common terminal COM, the high frequency coil 102 and the diode 113. The switching relay coils 90, 92 are holding. Thus, voltage continues to be supplied to the power source terminal 43 of the actuation circuit 200 even when a vehicle operator's hand releases the top-open command switch 4 after 0.5 s.

In contrast with the above embodiment, when the top-close command switch 5 is closed, in step 609, the switching relay coils 91, 93 are ON, so said coils are actuated simultaneously, initiating holding. Because the current flowing to motors 2 and 3 is reversed via the connection of the normally open terminal NO to the common terminal COM of the switching relay contacts 109 and 111, the rotational direction of said motors 2 and 3 is also reversed when the open command switch 4 is closed. In step 610, the field effect transistors 62–65 are ON, that is, MPU1 output ports FET1 and FET3 register "H", and the field effect transistors 62–65 register ON due to registered ON states of level conversion transistors 50 and 52, whereby voltage is received, respectively, by the bases of the field effect transistors 62, 63 and 64, 65 from the output terminals 54 and 55 of the actuation circuit 200. Thus, by the grounding of the motors 2 and 3 through common terminal COM of the switching relay contacts 109 and 111, the normally closed terminal NC and the source and drain of field effect transistors 62, 63 and 64, 65, the motor 2 and the motor 3 commence rotation in the normal direction, the driving shafts 96 and 97 rotate via the reduction mechanism, and top 120 begins to open via the crank arm 122, the primary link rod 123, the falling pillar 124, the secondary link rod 125 and the forming bar 126.

Step 611 is a process in which the buzzer 40 activates intermittently at 0.5 s intervals, informing an operator that opening (or closing) of the top is in progress. When output port BZ of MPU1 registers "H", the actuation transistor 41 registers ON and the ceramic buzzer 40 sounds. When output port BZ registers "L", the actuation transistor 41 registers OFF and the buzzer 40 stops sounding. In step 612, as rotation of the motor 2 is faster than that of the motor 3, a determination is made as to whether or not the electric potential from terminal 10 of the rotation sensor 27 has risen from "L" to "H" via signals to input ports SW4, SW6. If the electric potential rises, counter I amounted internally in MPU1 adds a value of one (+1) in step 613. When a determination is made that the difference in the values of internal counter I ,which counts the pulses from input port SW4, and internal counter II, which counts pulses from input port SW6, is 2 or more, synchronization correction is conducted in step 615. That is, when the value of counter I is larger, output port FET1 of MPU1 registers "H". In the result, the level conversion transistor 50 registers ON and the field effect transistors 62, 63 register OFF because the electric potential becomes "L" for output terminal 54, and the number of rotations decreases due to the motor 2 load resulting from interruption of current to the motor 2. Because output out FET3 of MPU1 registers "L", the level conversion transistor 52 maintains the OFF state, and because the output terminal 55 registers "H", field effect transistors 64 and 65 maintain the ON state, and rotation of the motor 2 is synchronized with that of the motor 3. In step 616, it is determined in the same way whether or not there is a rise in synchronization pulse of the motor 3. When the results of said determination are positive, the same processes are conducted in steps 617, 618 and 619 and synchronization corrections are completed. In process of step 619, in contrast with the aforesaid embodiment, rotations of the motor 3 are synchronized with those of the motor 2 because output port FET3 of MPU1 registers "H" and output port FET1 registers "L". Because of normal actuation with synchronization of motors 2, 3, the top can be opened in parallel with right and left sides of the vehicle 119 without tilting. In step 614 and 618, when the difference in values for internal counters I and II is determined to be less than 2, the motors 2 and 3 are rotated again. In the present embodiment, synchronization corrections are conducted when the difference in values for counters I and II are greater than 2 so as to prevent continual ON/OFF switching of both motors 2 and 3. In step 620, a check is made to determine whether or not the motor position sensor is ON, that is; a check is made to determine whether or not the electric potential of the terminals 12 and 13 has changed from "H" to "L" by means of the ON state of either of the position detecting switches 98, 99. If the results in step 620 determinations are positive, the position correction is conducted in step 620. That is, because either of right and left sides of the top 120 when the results of step 621 determinations are positive, in step 621, the motors 2, 3 internal position detecting switches 98 and 99 register ON, the motors 2 and 3 field effect transistors 62 and 63 or the field effect transistors 64 and 65 register OFF, and said field effect transistors 62, 63 or 64, 65 remain OFF until other position detecting switches 99 and 98 of motors 3 and 2 change from the OFF status to the ON status, and the position correction is conducted on driving shafts 96 and 97 from the motors 2 and 3.

In step 622, it is determined whether or not a rise in vehicle speed signal has occurred. When the result of said determination is positive, then the vehicle 119 commences travelling by top 120 opening to the defined position. In step 623, the field effect transistors 62-65 register OFF, and in step 624, the switching relay coils 90 and 92 register OFF, releasing holding status, and the opening actuation of the top 120 is stopped. Step 626 is a process wherein it is determined whether or not the motors 2, 3 are locked by means of the pulse spacing of the rotation synchronization sensors 27 and 28. If the crank arm 122 is forcibly restricted by abuting on the mechanical stopper, the pulse spacing of both rotation synchronization sensors 27, 28 becomes very long. If a human body or the like is caught in the top 120 during opening or closing of the top 120 and the motors 2, 3 are stopped because the motors 2, 3 are locked or the top 120 is completely closed by locking of a device for opening and closing of a top, the pulse spacing of both rotation synchronization sensors 27, 28 becomes very long in the same way. In this case, the results of determinations in step 626 are positive and in step 627 field effect transistors 62 to 65 register ON for 3 seconds and the current is supplied to the motors 2, 3 in the locked state. In step 628, field effect transistors 62 to 65 register OFF. Consequently, the supply of current to the motor is interrupted, so the motor is stopped. In step 629, the buzzer 40 registers ON for 1 second, and a lock trouble or an actuation stopping of the motor is informed. In step 630, the buzzer 40 maintains the OFF status. As the actuation when motor is locked is shown in the timing chart of FIG. 5, while the motor work at a constant speed, the synchronization pulses of the motors 2 and 3 are regularly generated, for instance, the impression voltage of the motor 2 is ON, the impression voltage of the motor 3 is ON and OFF and the buzzer blows intermittently at 0.5 s intervals. With an increase in motor load, the synchronization pulse spacing of the motors 2 and 3 is lengthened and from the motor lock detecting points on, after the electricity is supplied to the motor for 3 s in the motor-locked state the motor is OFF by the field effect transistor ON and the buzzer is OFF after the ON state for 1 s.

If the results of determinations in step 626 are negative, the process returns to step 611.

The aforesaid description of actuation mentions an instance wherein the top 120 is opened from the completely closed position, however if the top 120 is closed from the completely open position, the same actuation process occurs by means of pushing the close command switch 5.

In the aforesaid embodiment, by the provision of rotation synchronization sensors 27, 28 for the motors 2 and 3, the speed of the faster motor is equalized to the speed of the slower motor. If the rotation speeds of both motors are limited to a 20–30% difference by the adjustment of motor windings, the field effect transistors of the slower motor's rotation synchronization sensor and the accompanying output circuits can be eliminated.

(The second Embodiment)

Figure 14:
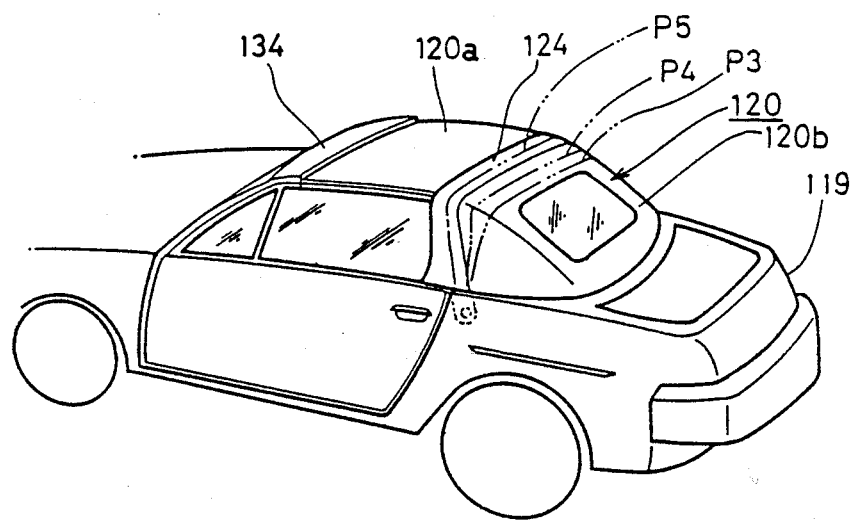
Figure 15:
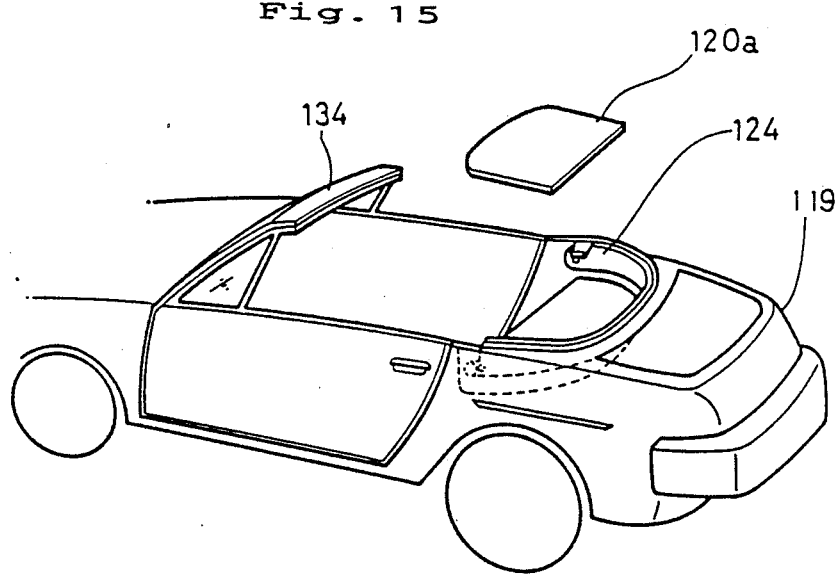
Figure 16:
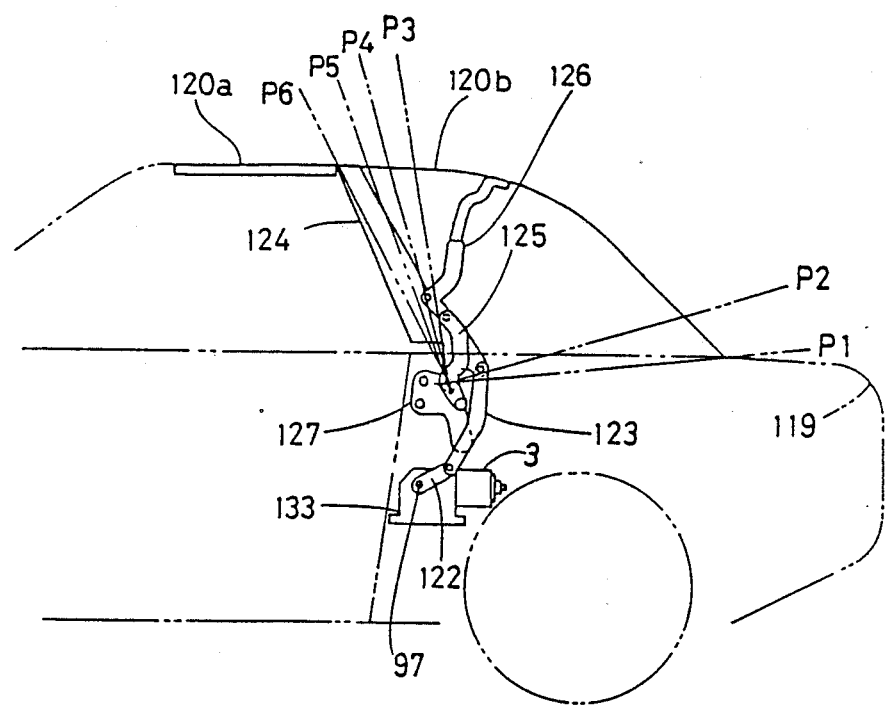
Figure 17:
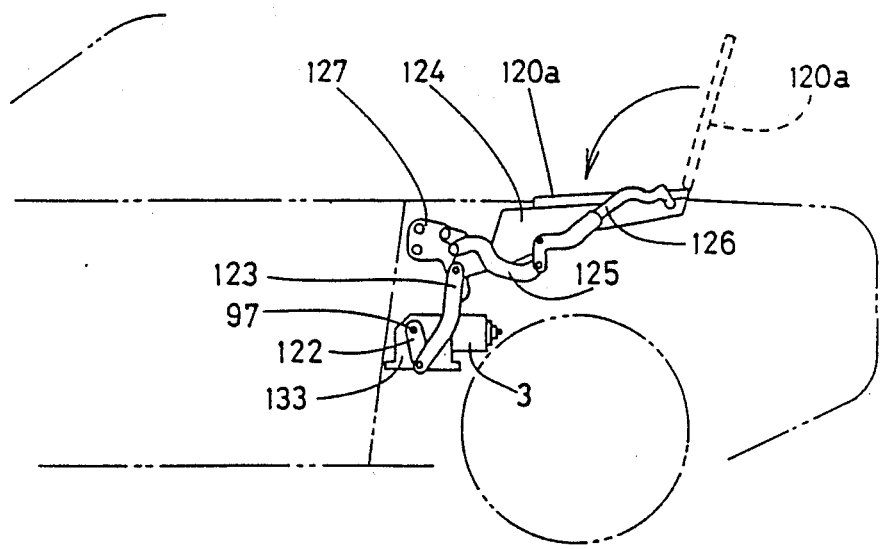

The second embodiment of the present invention is hereinafter described in accordance with FIGS. 6 to 17. FIGS. 14 and 15 are perspective views illustrating a vehicle wherein the device of the second embodiment is employed. FIGS. 16 and 17 are front views illustrating the abstract of a mechanical construction. Each drawing illustrates the top closed state and the top-open state, respectively.

A soft top 120b of the top 120 is fixed at the upper end thereof in a falling pillar 124 and at the lower end thereof in a vehicle body 119. The falling pillar 124 is swingably supported to a hinge bracket placed in both sides of a vehicle body and is coupled with an arm crank 122 by a link rod 123. The arm crank 122 is fixed to and rotated with a driving shaft 97 which is an output shaft of a reduction gear 133 united with a motor 3. A forming bar 126 adjusting the configuration of the soft top 120b of the top 120 is swingably supported in the middle of the falling pillar 124 and is coupled with the hinge bracket 127 by link rod B 125. According to the rotation of the output shaft 97 of a reduction gear 133, the falling pillar 124 and the forming bar 126 interlock, swing and permit opening and closing of the top from the closed state shown in FIG. 16 to the opened state shown in FIG. 17. A hard roof 120a is secured to the upper end of the falling pillar 124 and the hard roof 120a is opened and closed with the falling pillar 124. In the open-state as viewed in FIG. 17, the hard roof 120a is manually fallen and housed in a vehicle. In the closed-state as viewed in FIG. 14, the hard roof 120a is securely secured at the upper end thereof to the front pillar 134 of a vehicle body.

Accordingly, the present invention aims at preventing something from becoming sandwiched between the upper end of the hard roof 120a and the front pillar 134. That is, when the upper end of the falling pillar 124 reaches the momentary stopping position P4 shown in two-point chain line, the opening and closing movement is automatically interrupted and an operator's attention is urged. Also, if the upper end of the falling pillar 124 is located between the nongrounded positions P3 and P5 on which the momentary stopping position P4 is centered and the top is opened and closed from the stopped state, the interruption of the opening and closing movement is prevented when the upper end of the failing pillar passes through the momentary stoping position.

Figure 6:
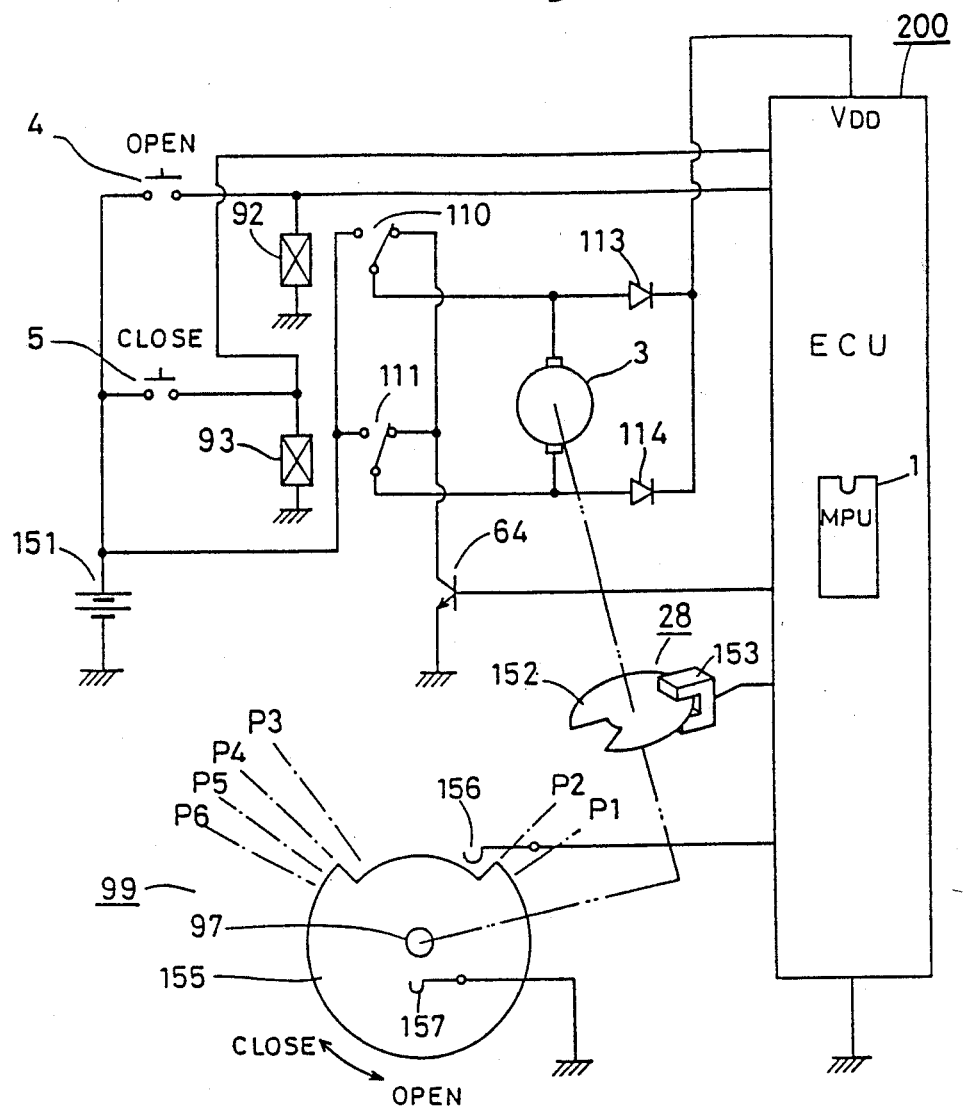

FIG. 6 is a block view illustrating the main part of a device for opening and closing of a top to realize the above-stated control idea.

The motor and the decelerator are provided, in both sides of a vehicle but only one is drawn here. The motor 3 is controlled by an electronic control unit (ECU) 200 with a microcomputer 1.

When a open command switch 4 or a close command switch 5 is pressed, a coil of a normal rotation switching relay 92 and a reverse rotation switching relay 93 is magnetized and the contacts 110, 111 of the each switching relay 92, 93 are switched. After an operator's finger is released from each command switch 4, 5, each relay 92, 93 is holding from the electronic control unit 200. Also only if either of switching relays 92, 93 is magnetized, the voltage of an electric power 151 is supplied to the electron control unit 200 via a diode 113 or 114. The motor is rotated and driven by the ON state of the transistor 64 according to a command from the electronic control unit 200 as the switching relay 92 or 93 is magnetized. The rotational direction is selected by the switching relays 92, 93.

The switching means which switches a connection with the electric source 151 is constructed so that the motor is rotated clockwise/counterclockwise and stopped via the switching relays 92, 93, the contacts 100, 111 and the transistor 64. The actuation means which switches the switching means to open and close top is realized by the microcomputer 1 of the electronic control unit 200. The rotation sensor 28 is built in the motor 3. The sensor 28 is composed of a disc 152 with a slit coupled with the output shaft of the motor 3 and a photosensor 153 detecting the slit of the disc 152. The rotation sensor 28 transmits a pulse signal to the electronic control unit 200 once with the defined rotary angle of the motor 3.

A position sensor 99 is built in the reduction gear 133 which is driven by the motor 3. The position sensor 99 is a cam switch which deflects a rotary position of the driving shaft 97. Said switch is composed of a conductor disc 155 turning with the driving shaft 97, a detecting contact 156 and a common contact 157 rubbing on said conductor disc notch is provided in the conductor disc 155 and the position of driving shaft 97 is detected as the detecting contact 156 touches or disconnects the conductor disc 155 by means of the notch. One of the detecting positions is a momentary stopping position P4 which stops the opening and closing movement of the top momentarily, the other is a correction position P2 described later. The completely-opened position P1, the correction position P2, the non-grounded positions P3, P5, the momentary stopping position P4, the completely-closed position P6, which are illustrated with one-point chain lines in FIGS. 1(a) and 1(c), show positions of the driving shaft 97 as each position comes on the detecting contact.

The Detailed circuit structure of a device for opening and closing of a top in the second embodiment is the same structure as that of the first embodiment in FIGS. 1(a), 1(b) and 1(c) except for the structure illustrated in FIG. 6.

Namely, the device for opening and closing of a vehicle top of the second embodiment is composed of the electronic control unit 200 with the control microcomputer being a principal element, the primary motor driving circuit 300 with a primary motor 2 being a principal element, the secondary motor driving circuit 400 with a secondary motor 3 being a principal element, and the open and close command switch circuit 500 comprising the open command switch 4 and the close command switch for commanding opening and closing of the top 120. Said switches 4 and 5 are push buttons, which are closed only during operation.

(Actuation of the Second Embodiment)

Actuation is hereinafter described in accordance with the above-mentioned construction. FIGS. 1(a), 1(b) and 1(c) illustrate a circuit in a non-actuated state. At this time, an open command switch 4 and a close command switch 5 are opened and a voltage is only impressed to a normally open contact NO of switching relay contacts 108, 109, 110 and 111 from an electric power terminal 112, and as the voltage is not supplied to motors 2, 3 and a power source terminal 43 of an electronic control unit 200, there are no malfunctions of the motors 2 or 3 from a noise or the like.

Explanation follows for the actuation process when the close command switch 5 is pushed to close a top 120 which is completely opened. The current flows into the ground through said switch 5, a diode 116 and a relay coil 93 from the positive pole of an electric source 151, and the switching relay contact 111 is ON and the common terminal COM thereof touch the normally open contact NO when the close command switch is closed. When the switching relay contact 111 is ON, the electric power is supplied to the power source terminal 43 via the positive pole of the electric source 151, the electric power terminal 112, the normally open contact NO of switching relay contact, the common terminal COM, the high-frequency coil 103 and the diode 114, then the electron control unit work. MPU1 is reset by the charge of condenser 31 from the earth and the slower voltage impression to the RST port than the VDD port when the electric power is supplied to the electric source terminal 43. During this reset, the output of MPU1, R13, R24, FET3, FET1 and BZ are all at low electric potential (hereinafter low voltage is referred to as "L" and high voltage as "H"), transistors 41, 50, 52 and transistors 68, 69 are all in OFF state, and through the OFF state of transistors 68 and 69, transistors 74, 75, 76 and 77 also reach the OFF state. As stated above, preparation is completed for the electronic control unit 200 and MPU1 and afterwards the process is conducted according to the previously-recorded program.

Figure 7A:
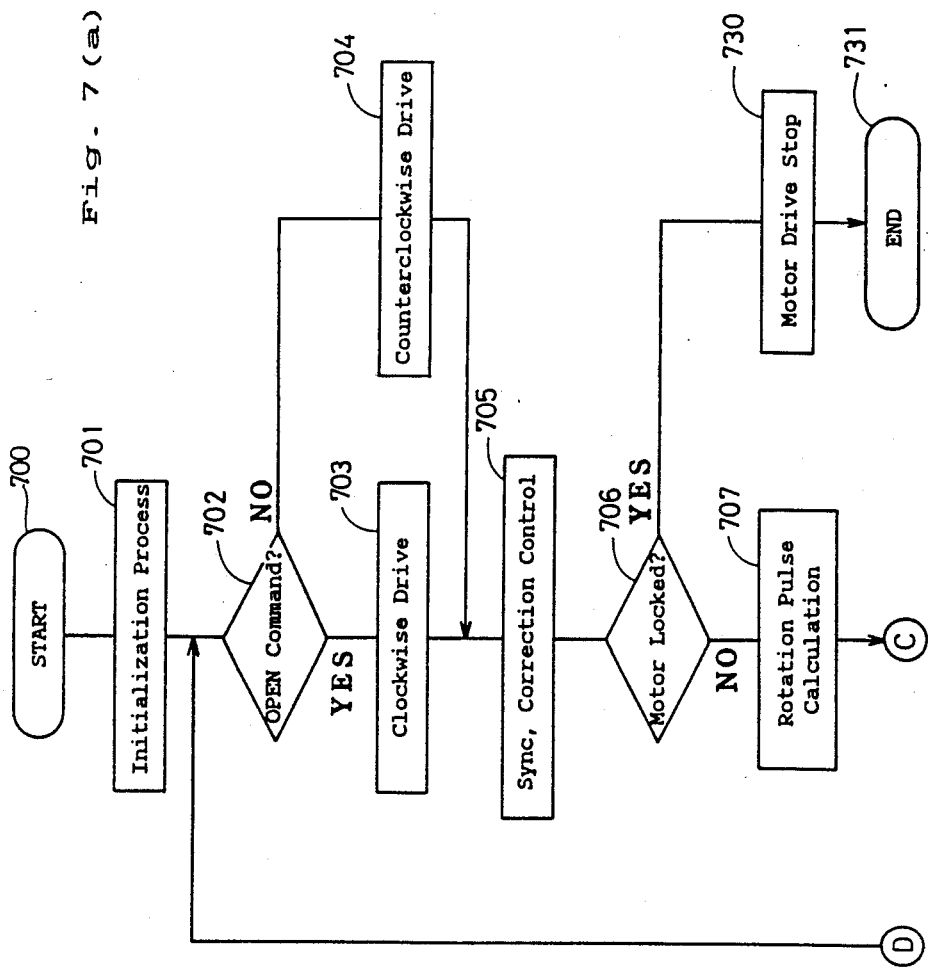
Figure 7:
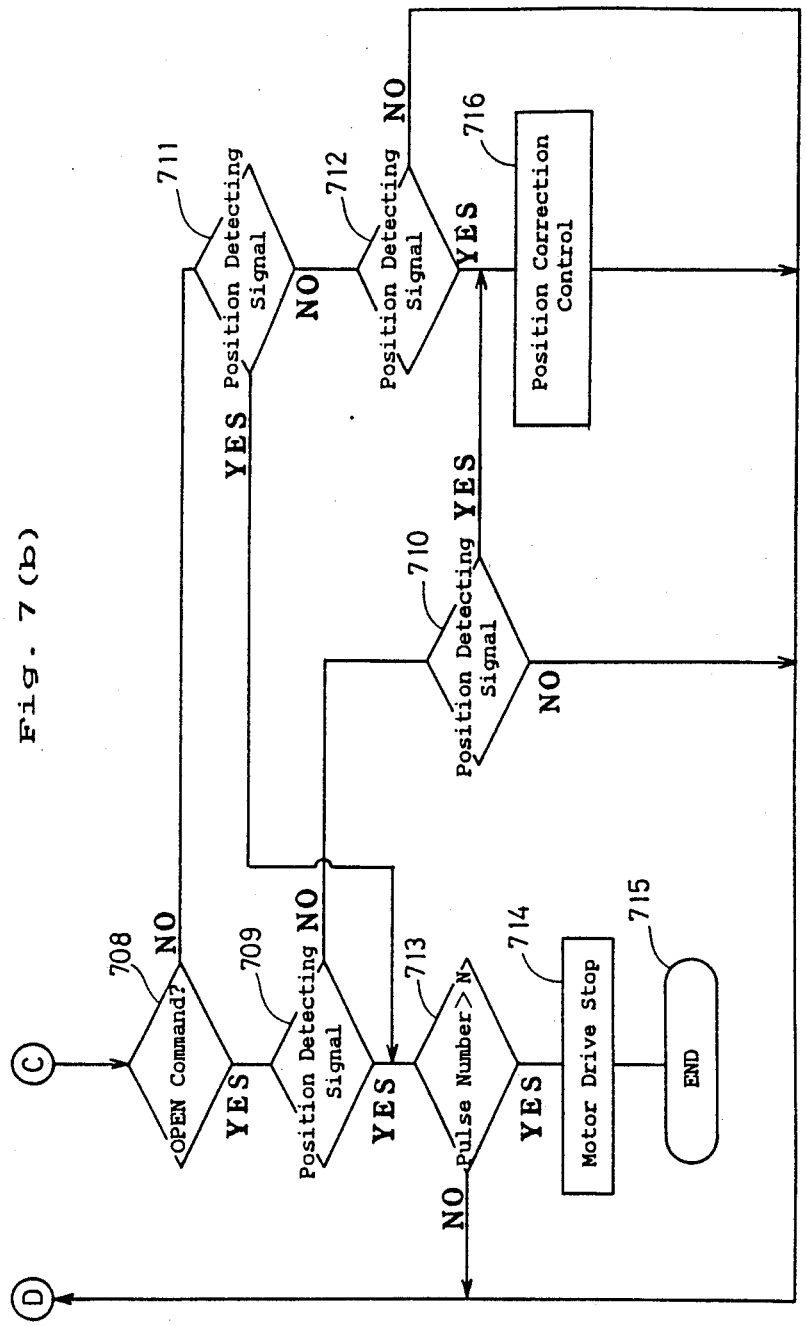

FIGS. 7(a) and 7(b) are a flow chart illustrating the process in MPU1, FIG. 8 is a time chart showing the movement from completely-open state to completely-closed state.

As the process 700 is started, in step 701 each flag and counter of MPU1 undergoes initialization first. In step 702, it is determined whether or not the open command switch 4 and the close command switch 5 are pushed. If the open command switch 4 is pushed, the voltage is applied to the input port O/C of MPU1 via said switch 4, diode 115 and terminal 46, and the input port O/C registers H. If the close command switch 5 is closed and the open command switch 4 is opened, said port O/C registers "L" via the pull-down resistor 49. If said input port O/C registers "H", the open flag is set and the process continues to step 703, if said input port registers "L", the process returns to step 704.

In step 703, the output port R13 of MPU1 register H, the level-conversion transistor 69 register ON, the switching relay driving transistors 74, 76 are ON and the switching relay coils 90, 92 register ON via the current from the output terminals 78, 80. As the voltage is supplied to the electric source terminal 43 via the normally-open terminal NO of switching relay contact 110, the common terminal COM, the high-frequency coil 102 and the diode 113, the relay driving transistors 74, 76 of the electronic control unit 200 remain the ON state, and the switching relay coils 90, 92 are holding. Thereby, even though a hand is released from the open-command switch 4, the voltage continues supplied to the electric source terminal 43 of the electronic control unit 200.

As the output ports of MPU, FET1 and FET3 register "L" and the level conversion transistors 50, 52 register OFF, the voltage is applied to gates of the field effect transistors 62, 63 and 64, 65, respectively, and these field effect transistors 62 to 65 register ON. Consequently, by the grounding of the motors 2, 3 through the high-frequency coils 101, 103, the common terminal COM of the switching relay contact 109 and 111, the normally-close terminal NC, the source and the drain of the electric field effect transistors 62, 63, 64, 65, the motor 2 or 3 commences rotation in the normal direction.

In step 704, the output port R24 of MPU1 registers "H" and the switching relay coil 91 and 93 work in the same way and are holding. Since the output ports FET1 and FET2 register "L" in the same way and the field effect transistors 62 to 65 register ON, the motors 2, 3 commence reverse rotation, and the driving shafts 96, 97 are rotated via the reduction gear 133, and closing of the top 120 is started.

In step 705, synchronization correction control is conducted. The right and left motors 2 and 3 are synchronized for rotation with a equal angle, the rotation pulses from the rotation sensors 27, 28 comprised by each motor 2, 3 are detected and a faster motor 3 or 2 is synchronized with a slower motor 2 or 3. Substantially, as field effect transistors 62, 63 or 64, 65 generating more rotation pulses are OFF for a short time, the rotation pulse number generated from the rotation sensors 27, 28 of the motors 2 and 3 is controlled for equalization. In step 706, it is determined by means of the rotation pulse generation interval time whether or not a rotation of motors 2, 3 is mechanically interrupted and is in the locked state. This locked state may occur both when the top 120 is completely opened or closed and when something is caught in the top 120. The process continues to step 730 in case of the locked state and the process continues to step 707 if the motors 2, 3 are rotated.

In step 707, the counter is integrated each time the rotation pulse from the rotation sensor 28 is generated, and the rotation pulse number generated after the process 700 is started is calculated and recorded. This rotation pulse number is used for judging the non-grounded area as stated later and this process 707 composes a motor rotation calculating means.

The next steps 708 to 712 discrimination processes is the processes for discriminating a position of the driving shaft 97, or the top 120 by means of the position signal from position sensor 99. If the top 120 is about to open (YES in step 708), the top is in the momentary stopping position P4 (YES in step 709) when the detecting contact 156 of the position sensor is disengaged from the conductor disc 155 and rise H in the position detecting signal is detected, and the top is in the correction position 2 (YES in step 710) when a drop in the position detecting signal is detected. Also, if the top 120 is about to close (NO in step 708), the top is in the correction position P2 (YES in step 712) when there is a rise for the position detecting signal from the position sensor 99, and the top is in the momentary stopping position P4 (YES in step 711) when there is a drop for the position detecting signal. When there are not a rise and a drop for the position detecting signal, the top is in an intermediate position other than the positions P2 and P4 (NO in step 710 or NO in step 712).

In case of the momentary stopping position P4, the process continues to step 713. In case of the correction position P2, the process continues to step 716. Also, in case of the other intermediate positions, the process returns to step 702 and the aforesaid processes are repeated.

In the present embodiment, till the top reaches from the completely closed position P1 to the correction position P2, the processes which returns from step 712 to step 702 are repeated, and the motors 2, 3 continue reverse rotations and when the top returns to the correction position P2 the process continues to step 716 from step 712.

In step 716, the positions of both right and left driving shafts 96, 97 which drive the top 120 are provided. This is executed by the momentary OFF state of the field effect transistors 62, 63 or 64, 65 driving the motor 2 or 3 which reaches the correction position P2 previously, till the other motor 3 or 2 reaches the correction position P2. Consequently, the top is opened and closed while the right and left thereof maintain the same positions without driving of motors 2 and 3 as the rotation positions of both driving shafts 96 and 97 are out of position.

While the processes are repeated to step 702, the driving shafts 96, 97 rotate more, and as they reach the momentary stopping position P4, the process continues from step 711 to 713.

In step 713, it is examined whether or not the rotation pulse generating number from the starting of the process 700 which is calculated in step 707 is the defined number N or more. If the pulse number is the defined number or more, the opening and closing movement of the top 120 is started farther than the non-grounded position P3 or P5 whereon the momentary stopping position is centered, and if the pulse number is the defined number or less, the opening and closing movement of the top is started at the non-grounded area within the non-grounded positions P3, P5. If the pulse number is the defined number N or more, the process continues to step 714, and if the pulse number is the defined number or less, the process returns to step 702.

In the present embodiment, because the opening and closing movement of the top is started in the completely-open position P1, the rotation pulse generating number is over the defined number, and the process continues to step 714.

In step 714, driving of the motors 2, 3 is stopped, that is; after the field effect transistors 62 to 65 register all OFF and the supply of current to the motors 2, 3 is interrupted, holding of the switching relay coils 90 to 93 is also disengaged and is OFF. As a result thereof, the supply of electric power to the electron control unit 200 and MPU1 from the vehicle electric power 151 is also interrupted and the motor returns to the condition before the process 700 is started. The top 120 keeps stopping at the momentary stopping position P4 just before the top is completely closed. The process of steps 608 to 614 compose the momentary stopping means which stops the motors 2, 3 according to the position signal from the position sensor 28.

After ascertaining there is nothing between a hard roof 120a and a front pillar 134, an operator pushes the close command switch 5 again. By this operation the electric source is supplied to the electron control unit 200 and MPU1 again, the process 700 is recommenced and a reverse rotation of the motors 2, 3 is started.

Soon the top 120 reaches the completely closed position P6 and is in the mechanically locked state. Thereby, the process continues from step 706 to 730. In step 730, the same process with said step 714 is executed and after the motors 2, 3 are stopped, the supply of the electric power to the electronic control unit 200 and MPU1 is interrupted, so the process is completed.

The aforesaid explanation shows the movement of top from completely open position P1 to completely-closed position P6 illustrated in FIG. 8.

FIG. 9 is a time chart showing the actuation when the top 120 is opened from the completely closed position P6. In this case, the same process with the aforesaid is conducted by pushing of the open command switch 4 save that the holding switching relays turn into 90, 92 and the motors 2 and 3 are driven in the normal direction. The top is stopped at the momentary stopping position P4 which opens slightly from the completely closed position P6 in the opening movement. After ascertaining that there is nothing in the top 120 built-in place and that nothing is caught in the link rods 123, 125, an operator opens the top 120 completely by pushing the open command switch 4 again.

FIGS. 10 and 11 are time-charts showing the closing and opening movement from the half-open position farther than non-grounded position P3 or P5. In this case, the same process that is shown in FIGS. 4 or 5 is conducted.

Figure 12:
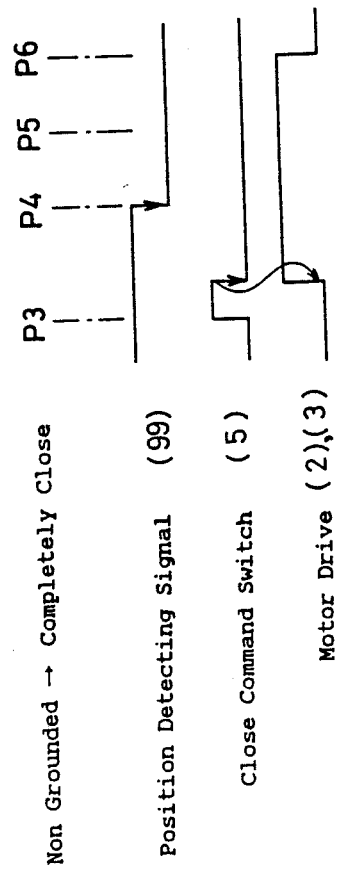
Figure 13:
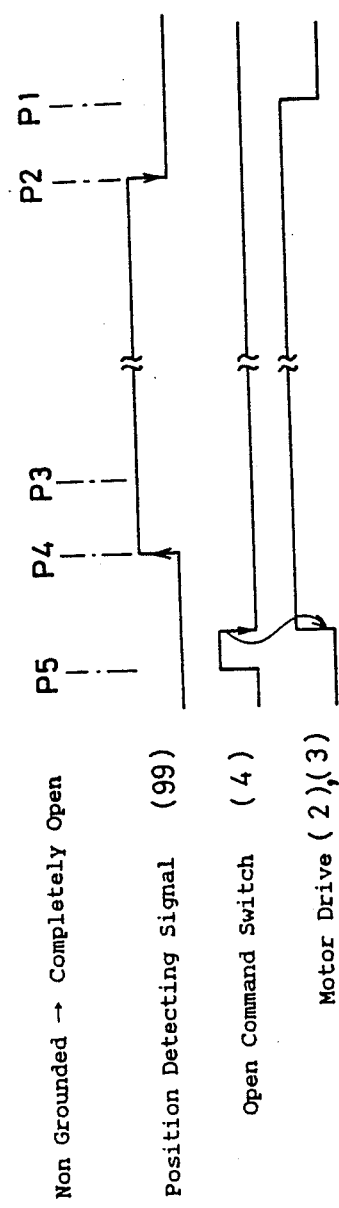

FIGS. 12 and 13 are time-charts when the top is closed and opened from within the non-grounded position area near to the momentary stopping position P4. Such a movement occurs for example, if some troubles are found, the top 120 is opened and is restored to the original position when the top is stopped at the momentary stopping position P4 if the top is completely closed from the completely-open position P1.

In this case, the top reaches the momentary stopping position P4 soon after driving of motors 2, 3 is started. When the momentary stopping position P4 is detected in step 709 or 711 and the process continues to step 713, the generating number of the rotation pulse is fewer than the defined number because the motors 2 and 3 rotate only a little. Thereby, the process returns from step 713 to 702 without continuing to step 714 and driving of motors 2, 3 is continued without the top stopping at the momentary stopping position P4. When the pulse number is over the defined number, the process continues to step 710 or 712 and does not reach step 713 because the top has passed through the momentary stopping position P4. The process in step 713 composes a momentary stoppage prohibiting means which prohibits the momentary stopping actuation if the pulse number does not reach the defined number. As the top 120 reaches the completely-closed position P6 or the completely-open position P1, the motors 2, 3 are in the locked state, and the process continues from step 706 to 730, and all are stopped, so the movement is completed.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An electric-driving device for an openable member wherein the openable member is opened and closed according to rotation of a motor shaft provided with a motor, said device comprising:

a reduction gear mechanism which is rotated by said motor shaft and which operates the openable member via a driving shaft;

a switching means for switching the direction of rotation of said motor;

an open command switch and a close command switch which command the opening and closing of said openable member, respectively;

an open/close command determination means for determining whether or not said open command switch and said close command switch have been operated;

an actuation means for actuating the motor via said switching means to open and close the openable member according to a signal generated by the open/close command determination means;

a position sensor provided on the driving shaft for detecting if the driving shaft is rotated in a defined rotation position just before the openable member is closed;

a rotation sensor provided in said motor for generating a pulse synchronized with the motor rotation;

a motor rotation calculating means for calculating a generating number of said pulse after the motor rotation is started by way of said actuation means;

a momentary stopping means for stopping the motor by switching the switching means in accordance with generation of a position signal from the position sensor if the calculated pulse generating number reaches a defined number before the generation of the position signal; and a momentary stopping prohibiting means for prohibiting actuation of said momentary stopping means if the calculated pulse generating number does not reach the defined number before the generation of the position signal.

2. The electric-driving device for an openable member according to claim 1, including:

a crank arm coupled with the driving shaft;

a mechanical stopper which is fixedly installed in the motor to compulsorily limit the rotation of the driving shaft by abutting with the crank arm;

a motor lock detecting means for detecting locking of the motor by detecting a pulse width generated by said rotation sensor; and an actuation stopping means for stopping actuation of said actuation means if there is a signal from the motor lock detecting means.

3. The electric-driving device for an openable member according to claim 1, including:

two driving shafts provided in right and left sides of a vehicle;

two motors rotating each driving shaft via said reduction gear mechanisms; and a synchronization correction means for interrupting a current to a faster one of the two motors and for feeding a current to the other motor if a predetermined difference in the values of pulses generated from the rotation sensors provided in the motors is reached.

4. The electric-driving device for an openable member according to claim 1, including;

two driving shafts provided in right and left sides of a vehicle;

two motors for rotating the driving shafts via reduction gear mechanisms;

two position sensors, one provided on each of the driving shafts for detecting whether either one of the driving shafts is rotated in a defined position just before the openable member is completely opened and completely closed; and a position correction means for stopping one of the motors until a position sensor of the other motor generates a position signal if the one of the position sensors generates the position signal when the openable member is in the position just before being completely opened or completely closed.

* * * * *